No. 785,170. PATENTED MAR. 21, 1905.
H. DE F. HUBBARD.
VEHICLE WHEEL TIRE.
APPLICATION FILED DEC. 30, 1903.
2 SHEETS—SHEET 1.
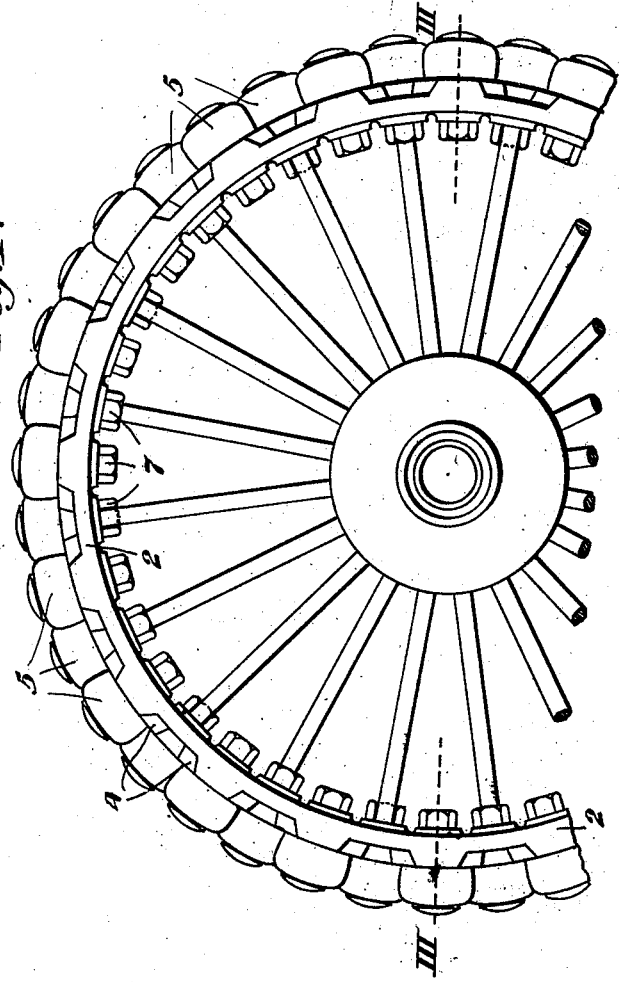
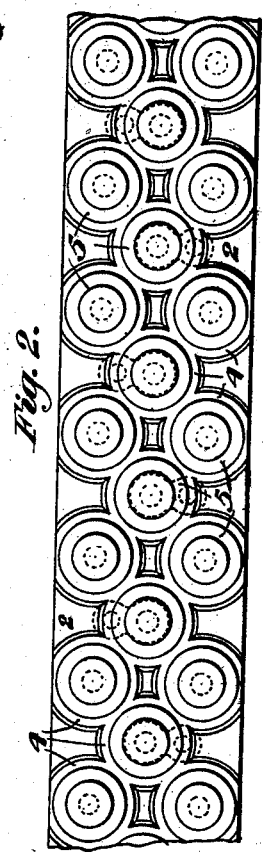
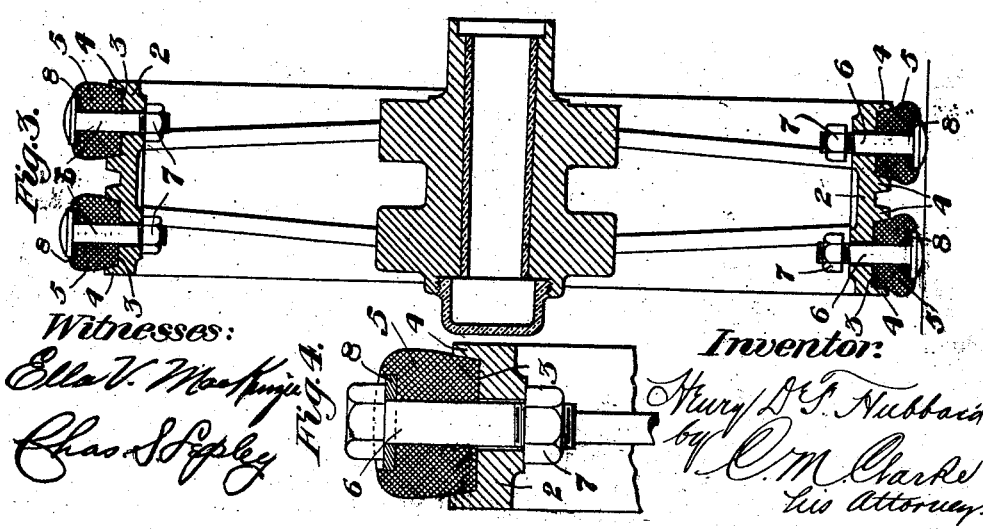

No. 785,170. PATENTED MAR. 21, 1905.
H. DE F. HUBBARD.
VEHICLE WHEEL TIRE.
APPLICATION FILED DEC. 30, 1903.

2 SHEETS—SHEET 2.

Witnesses:
Inventor.

No. 785,170. Patented March 21, 1905.

UNITED STATES PATENT OFFICE.

HENRY DE FOREST HUBBARD, OF AVALON, PENNSYLVANIA.

VEHICLE-WHEEL TIRE.

SPECIFICATION forming part of Letters Patent No. 785,170, dated March 21, 1905.

Application filed December 30, 1903. Serial No. 187,161.

*To all whom it may concern:*

Be it known that I, HENRY DE FOREST HUBBARD, a citizen of the United States, residing at Avalon, in the county of Allegheny and State of Pennsylvania, have invented certain new and useful Improvements in Vehicle-Wheel Tires, of which the following is a specification, reference being had therein to the accompanying drawings, forming part of this specification, in which—

Figure 5:
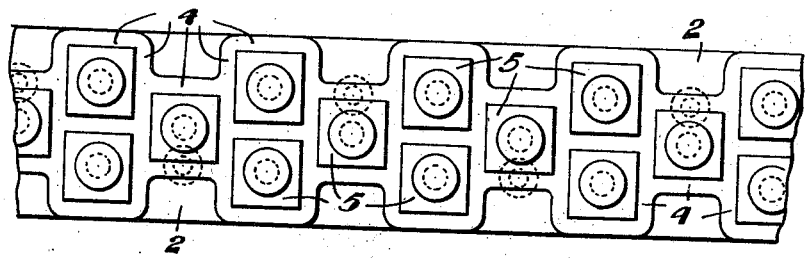
Figure 6:
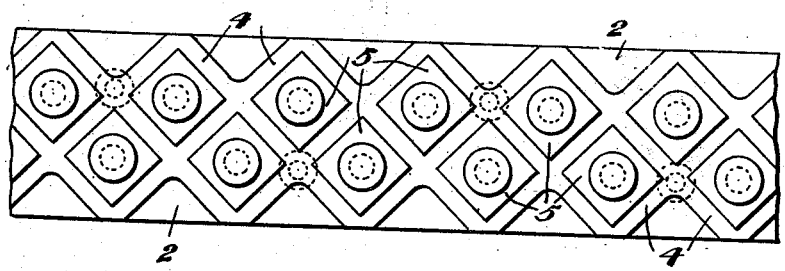
Figure 7:
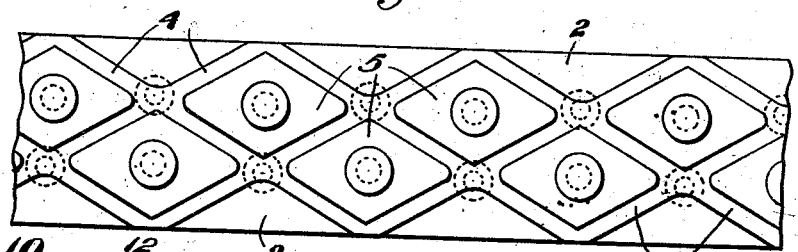
Figure 10:
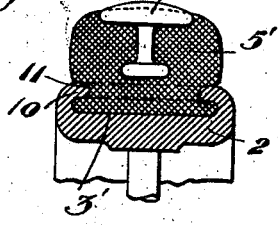
Figure 8:
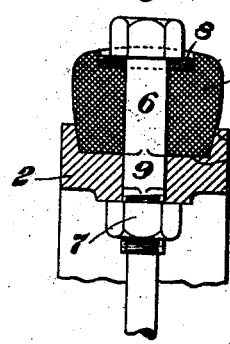
Figure 9:
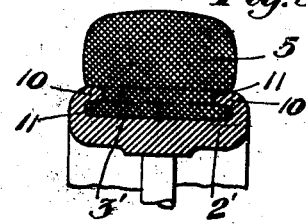

Figure 1 is a side view of a vehicle-wheel provided with my improved tire, partly broken away. Fig. 2 is a partial development of the exterior of the tire in plan. Fig. 3 is a vertical sectional view indicated by the line III III of Fig. 1. Fig. 4 is an enlarged sectional detail view showing a narrower tire, having a single row of tread-abutments. Figs. 5, 6, and 7 are views similar to Fig. 2, showing various forms of tread-abutments. Fig. 8 is a sectional view similar to Fig. 4, showing a square-shanked bolt. Figs. 9 and 10 are cross-sectional detail views showing modified constructions of tread-abutments.

My invention relates to tires for vehicles, particularly automobiles or traction-trucks for heavy work, and is designed to provide a tire which will be serviceable and durable under heavy loads and which will retain all of the advantages of a resilient tire, having metallic contacting elements which will protect the resilient ground-contact portions of the tread from excessive wear, while retaining all of the advantages thereof.

In general the invention consists in providing the tire with a continuous series of individual tread-abutments closely assembled and so arranged as to provide a rolling series of cushioning contacting treads. In the use of solid-rubber or pneumatic tires considerable trouble and expense results from the rapid wear and deterioration of the tire, especially under heavy loads, and as the most practical forms of such tires are approximately circular in cross-section the available tread-surface at the point of contact is limited, so that the wear is necessarily excessive.

One of the objects of my invention has been to provide a tire which is provided with a series of tread-abutments arranged either as a single row or otherwise. The number may be varied as to width to suit requirements or conditions and will overcome the objections noted, while retaining all of the advantages incident to an all-rubber tire for either smooth or rough ground.

Referring now to the drawings, 2 is the tire, connected by the usual spokes to the hub of any suitable construction or design. The tire is of forged, rolled, or cast metal and is provided on its outer surface with a continuous series of closely-adjacent recesses 3, with surrounding reinforcing retaining flanges or armors 4. The function of these recesses and flanges is to receive and provide sockets for the tread-abutments 5, of rubber or other suitable resilient material, which are seated therein and preferably held by suitable retaining means, as bolts 6, which pass through elongated bearing-openings in the tire and are retained by nuts 7 on their inner ends. The outer end of the bolt may be of the usual bolt-head form, as in Fig. 4, or may be of button-head form, as in Figs. 1, 2, and 3, or of any other form or shape, according to the conditions of use. Ordinarily I prefer to interpose a washer 8 underneath the head in a recess in the outer portion of the tread-abutment. These abutments may be of various forms, as shown, either circular or square, diamond or of other quadrilateral shape, and it will be observed that in the latter forms they may be arranged somewhat more compactly together, although it is desirable that an appreciable space shall be maintained between the abutments. The advantages of this latter feature of construction is that each abutment is thus free and independent in its action, the tire has a high traction efficiency, will keep itself clean, and on rough ground, as cobblestones or Belgian blocks, will present considerable lateral engagement of the contacting portions of the treads and is not liable to slip. A further advantage is that the quadrilateral treads may be variously arranged, so as to overlap beyond each other, providing a practically continuous tread, as in Figs. 6 and 7, or may be compactly grouped to secure the same effect, as in Fig. 5.

Each individual tread-abutment will compress under the load, as shown at the bottom of Fig. 3, projecting the inner ends of the bolts 6 upwardly through the bolt-holes, which are slightly larger in diameter, resuming the normal extended position when relieved from pressure, although in putting the abutments in place it is preferable to partly compress the rubber by drawing the bolt in by the nut. When thus constructed, the outer bolt-head makes the main contact and is subject to the greatest wear, although in practice the rubber abutments may be compressed downwardly around the head and bear with more surface against the ground.

When it is desired to prevent the bolts 6 from turning, their shanks may be squared, as at 9, Fig. 8, and it will be understood that any means may be employed for locking the nuts or that other securing devices may be substituted for the nut.

The tire is especially adapted for heavy traffic or rough roads. It is very easy to turn out of tracks without slipping and is not liable to slide under any conditions. The tread-abutments may be readily and easily replaced when worn, while the entire construction is very economical in first cost and to maintain.

In Fig. 9 I have shown a modified construction in which the tread-abutment 5' is not provided with a metallic bearing-face, but is composed entirely of cushioning material and is seated in the recess 3' of the tire 2', which is provided with surrounding clencher-flanges 10, entering corresponding annular recesses 11 in the tread-abutment.

In Fig. 10 the tread-abutment is provided with an inserted metal bearing-tread 12, molded or otherwise secured in the tread-abutment only, without any connection with the tire other than the engagement thereof with the abutment.

In both constructions the abutments are forced into the recesses and held by the annular inwardly-extending clenching-flanges.

Various changes and modifications may be made in the design, proportions, arrangements of treads, or in other details by the skilled mechanic, and all such are to be considered as within the scope of the following claims.

What I claim is—

1. The combination with a tire having straight parallel edges and alternately-arranged abutment-receiving recesses arranged upon its tread-surface; of a series of adjacent quadrilateral resilient tread-abutments having metallic bearing-faces alternately arranged out of alinement with each other in the receiving-recesses, substantially as set forth.

2. A wheel-tire provided with adjacent resilient tread-abutments having metallic bearing-faces, alternately arranged out of alinement with each other around the tire-periphery, substantially as set forth.

3. A wheel-tire provided with adjacent quadrilateral resilient tread-abutments having metallic bearing-faces, alternately arranged out of alinement with each other around the tire-periphery, substantially as set forth.

4. A wheel-tire provided with separate adjacent resilient tread-abutments having metallic bearing-faces located centrally within the area of the tread and projecting outwardly beyond thereof, arranged diagonally across the face of the tire, substantially as set forth.

5. A wheel-tire provided with a series of recesses and a series of separate resilient tread-abutments secured in said recesses, arranged diagonally across the face of the tire, and having metallic bearing-faces, substantially as set forth.

6. A wheel-tire provided with a series of recesses, ground-contact tread-abutments of resilient material mounted therein, and bolts secured in the tire passing through the abutments and provided with bearing-heads extending beyond the abutments, substantially as set forth.

7. A wheel-tire provided with a series of recesses, ground-contact tread-abutments of resilient material mounted therein, and bolts secured in the tire passing through the abutments and provided with bearing-heads extending beyond the abutments, with intervening bearing-washers, substantially as set forth.

8. A wheel-tire provided with a series of recesses and bolt-openings, ground-contact tread-abutments of resilient material seated in said recesses, and securing-bolts passing through the abutments and tire, provided with bearing-heads extending beyond the abutments, and securing-nuts, and so mounted in the tire as to permit free movement of the bolts, substantially as set forth.

9. A wheel-tire provided with a series of peripheral recesses, ground-contact tread-abutments of resilient material mounted therein, and securing-bolts passing through the abutments and provided with bearing heads normally extending beyond the faces of the abutments, substantially as set forth.

10. The combination with a wheel-tire provided with a series of abutment-receiving cavities having surrounding retaining-flanges, of a series of ground-contact rubber abutments mounted in said recesses, and securing-bolts passing through the abutments and tire provided with bearing-heads extending beyond the bearing-faces of the abutments, and provided with inner securing-nuts, substantially as set forth.

11. The combination with a wheel-tire provided with a series of abutment-receiving cavities having surrounding retaining-flanges, of a series of ground-contact rubber abutments mounted in said recesses, and securing-bolts passing through the abutments and tire provided with bearing-heads extending beyond the bearing-faces of the abutments and provided with inner securing-nuts, said bolts being capable of inward and outward movement through the tire-bearing, substantially as set forth.

12. A wheel-tire provided with a series of alternately-arranged quadrilateral bearing-abutments of resilient material with securing-bolts passing through the abutments and provided with bearing-heads, substantially as set forth.

13. A wheel-tire provided with a series of recesses and a series of separate resilient ground-contact tread-abutments secured in said recesses, with bolts secured in the tire passing through the abutments and provided with bearing-heads arranged to make contact with the ground, substantially as set forth.

In testimony whereof I affix my signature in presence of two witnesses.

HENRY DE FOREST HUBBARD.

Witnesses:
 ALBERT A. MANTELL,
 JAMES McC. MILLER.